Jan. 13, 1925.
M. MADSEN
TANK GAUGE
Filed Jan. 11, 1923  4 Sheets-Sheet 4
1,523,345
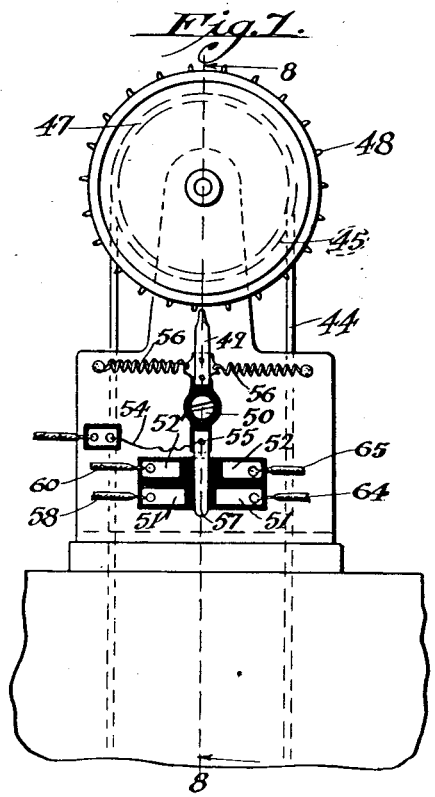
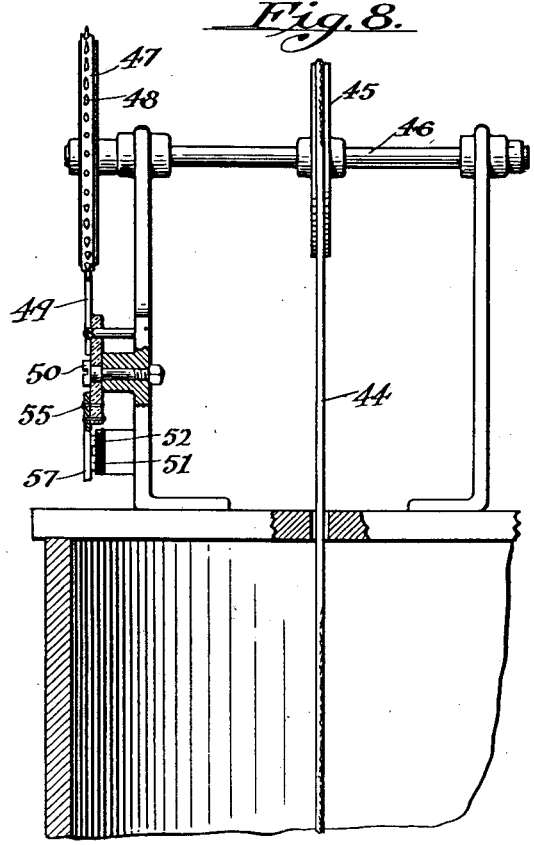
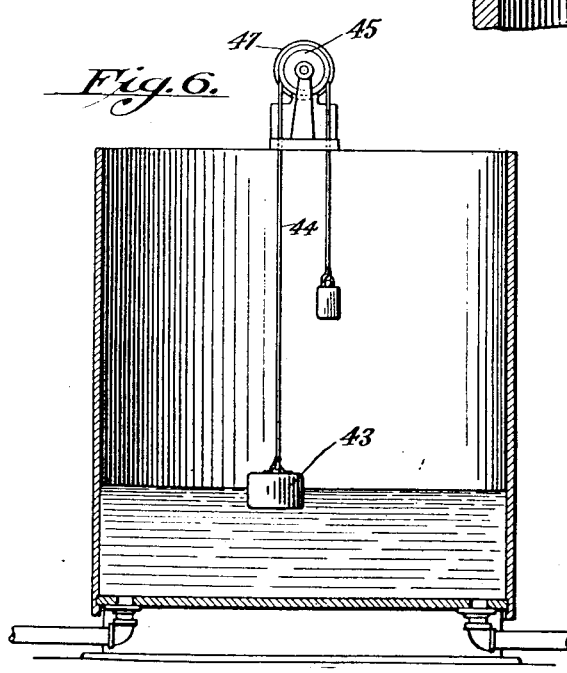
Inventor:
Martin Madsen.
By Hazard & Miller
Attorneys Patented Jan. 13, 1925.

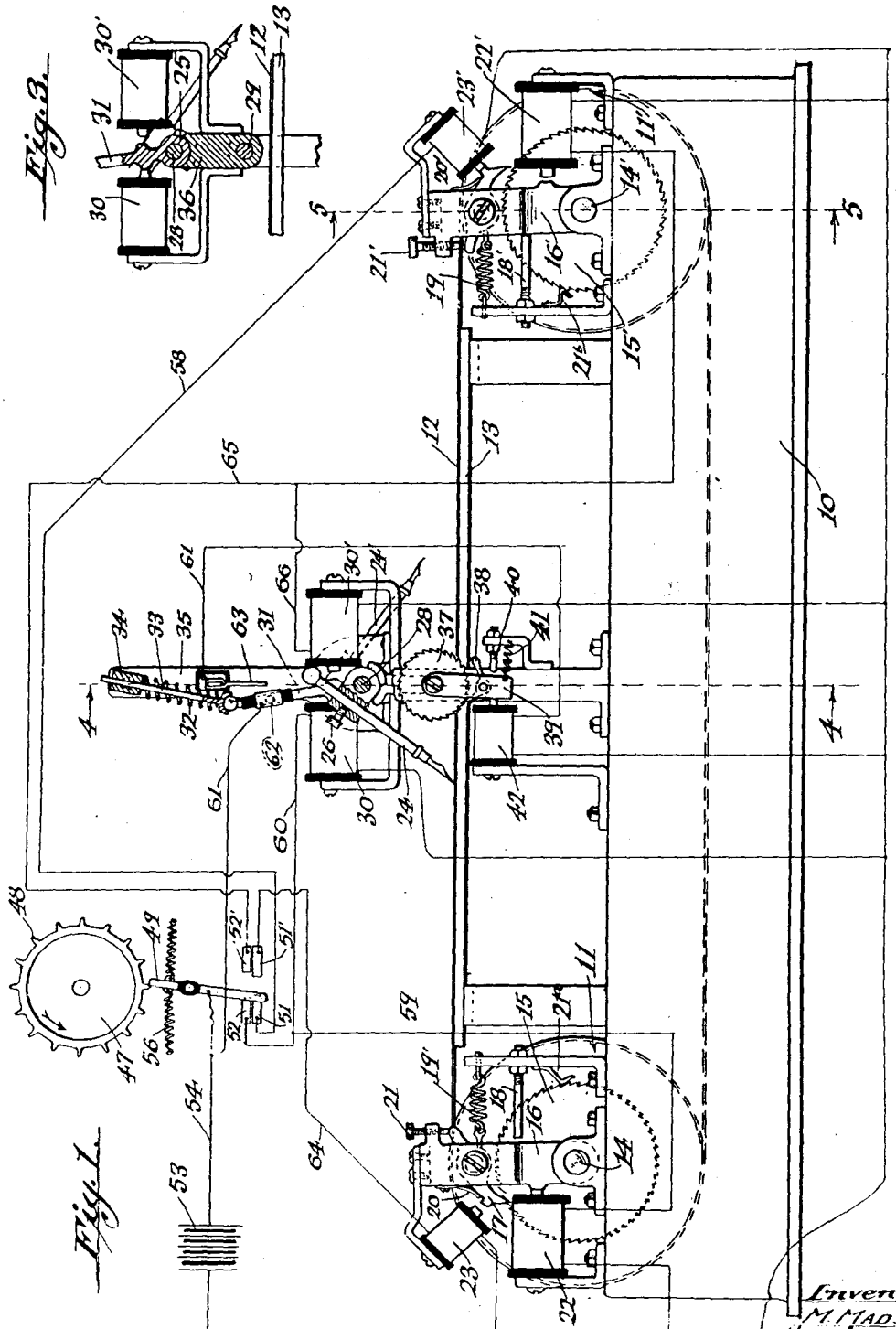

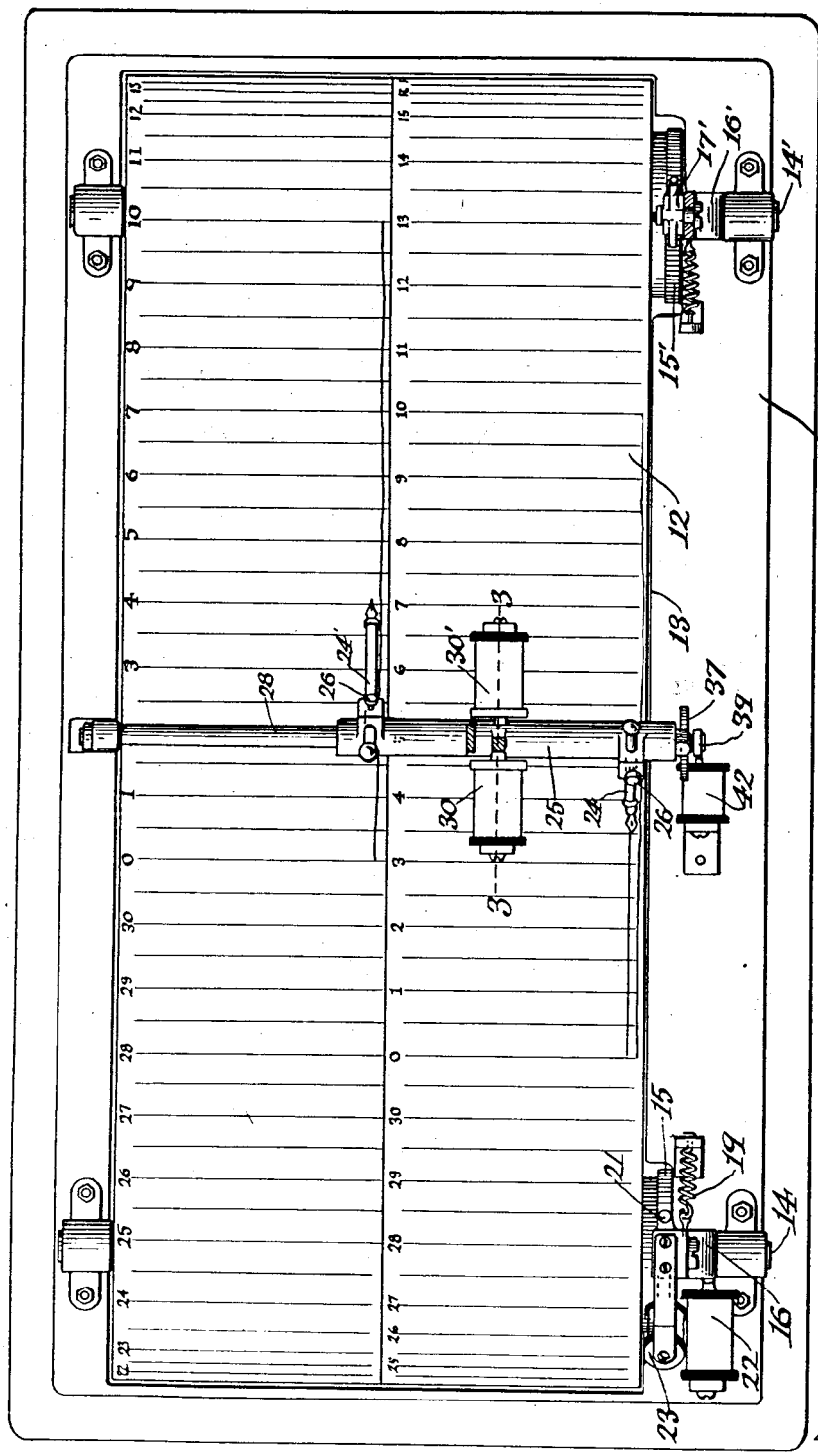

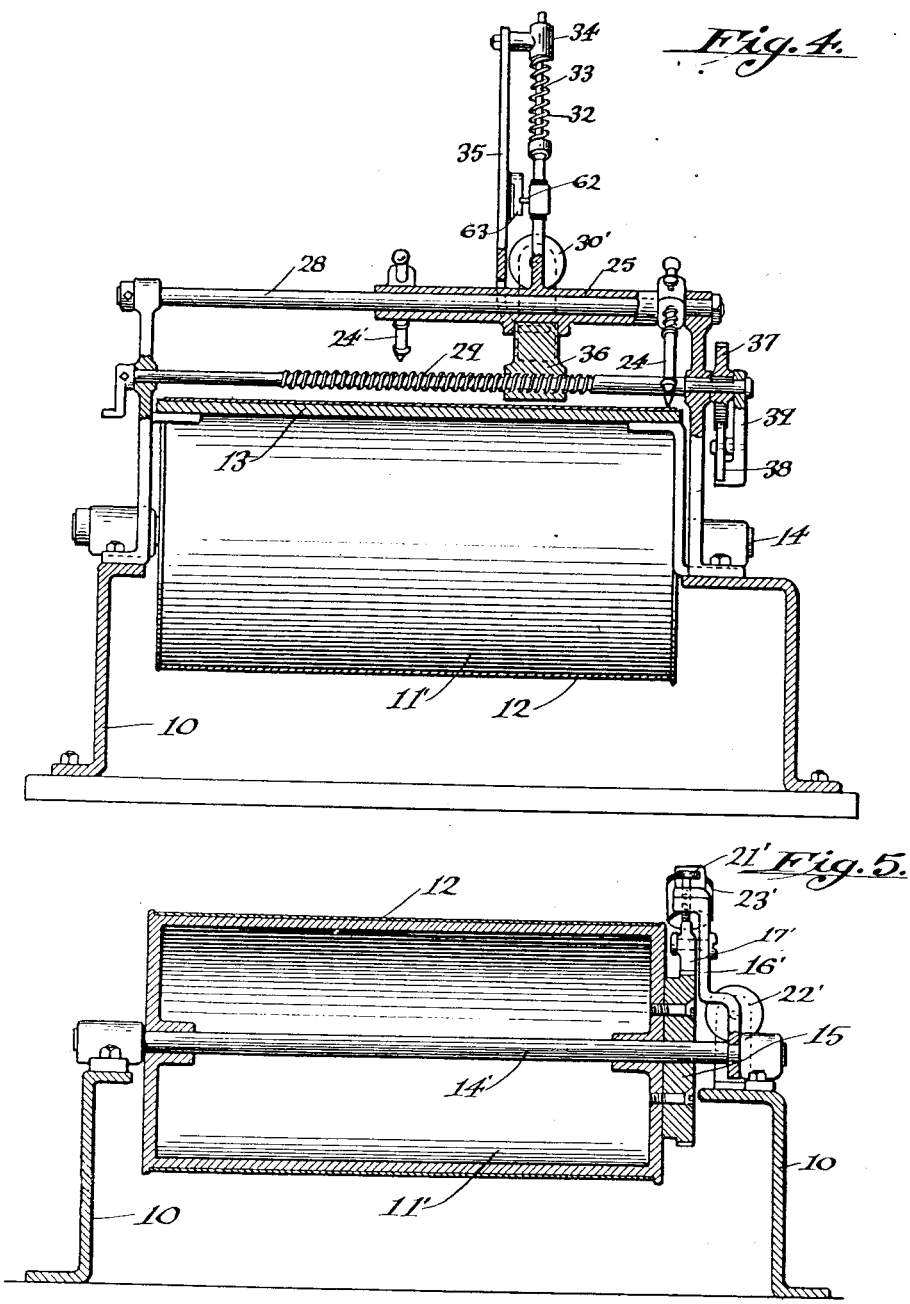

1,523,345

UNITED STATES PATENT OFFICE.

MARTIN MADSEN, OF CASMALIA, CALIFORNIA.

TANK GAUGE.

Application filed January 11, 1923. Serial No. 611,966.

*To all whom it may concern:*

Be it known that I, MARTIN MADSEN, a citizen of the United States, residing at Casmalia, in the county of Santa Barbara and State of California, have invented new and useful Improvements in Tank Gauges, of which the following is a specification.

My present invention relates to a tank gauge, it being the general object of my invention to provide means whereby the level of a confined liquid, or the contents of a tank, may be ascertained from, or recorded at, a remote point.

It is a further object of my invention to provide satisfactory level-responsive means, and especially means for recording changes in liquid levels, such recording to be made either in terms of quantity or in terms of distance.

It is a further object of my invention to provide, in one form of my device, means whereby not only the fact and the extent of fluctuations in liquid levels, but also the time of occurrence of such fluctuations in liquid levels shall be permanently recorded.

It is a further object of my invention to provide condition-responsive means of the character referred to which shall be adapted to indicate or record conditions at a remote point by the employment of electrical or electro-magnetic means.

It is a further object of my invention to provide means which may comprise suitable parts connected with each of a plurality of tanks and additional parts remote therefrom, the whole being so organized that variastions in the contents of the respective tanks or other containers may be indicated and recorded at a central station, so that one person may watch the level in a large number of tanks.

It is a further object of my invention to provide means for indicating not only all intentional additions and withdrawals of liquid from a tank or tanks, but also all changes that may be due to leakage, evaporation, theft, or other causes.

It is a further object of my invention to provide means whereby the rise or fall of a float may cause a switch or switches to be repeatedly closed by mechanism located in the vicinity of a tank, and also to provide means whereby such repeated closing of a switch or switches may impart a step by step movement to a record sheet, or to a writing point, or to both.

It is a further object of my invention to provide suitable means for carrying and positioning record sheets and writing points respectively in such relation that an electric current may be employed to actuate the same in the production of a permanent record.

Further objects of my invention will appear from the following description and the claims appended thereto, it being understood that various features or parts of my invention may be independently employed, and that various modifications may be made therein without departing from the spirit and scope of my invention as the same is indicated in the said description and claims.

It is believed that the general character of my invention will be readily understood from the following descriptions of a preferred embodiment and a modification thereof, taken in conection with the acompanying drawings, in which—

Figure 1 is a side elevation of an electrically actuated recording means, a remote switch and actuating means therefor, as well as wiring connections being shown diagrammatically.

Fig. 2 is a plan view showing mostly the parts disclosed in Fig. 1, and showing a record such as might be produced by first filling a tank to a depth of 10 ft., thereafter emptying the same, and then refilling to a depth of 4 ft..

Fig. 3 is a detail section on the line 3—3 of Fig. 2.

Fig. 4 is a vertical section on the line 4—4 of Fig. 1.

Fig. 5 is a vertical section on the line 5—5 of Fig. 1.

Fig. 6 is a vertical section of a tank, showing the liquid therein and the float operated mechanism by which is actuated the switch operating device shown in Fig. 7.

Fig. 7 is a detail view of the switch operating mechanism adapted to be installed upon or adjacent to a tank provided with the float shown in Fig. 6.

Fig. 8 is a sectional elevation taken approximately on the line 8—8 of Fig. 7.

Referring in detail to the specific form of my device shown in Figs. 1 to 8 inclusive, 10 is a main foundation upon which the parts of my recording mechanism may be secured. This recording mechanism may consist essentially of means for carrying writing points and cylindrical members 11 and 11', adapted to carry a record sheet or web 12 which may be supported upon a table or platen 13. Adjacent the ends of the table 13, I may provide any suitable actuating means to move the respective cylinders 11—11'; and I prefer to provide, for this purpose, pawl and ratchet mechanisms, which may be mounted upon the same axes 14 and 14', upon which the mentioned cylinders are adapted to rotate.

Each of these pawl and ratchet mechanisms may comprise a toothed wheel 15 and 15' secured at one end of its record-carrying cylinder, and adapted to be advanced by the movement of an arm 16—16', also provided on one of the mentioned axes. The respective arms 16—16' are shown as carrying pawls 17—17', respectively adapted to be moved to an upright position, or a position in contact with the stops 18—18' by means such as the springs 19—19' and adapted to be pressed by springs 20—20' into contact with the teeth of the ratchet wheels 15—15', suitable adjusting means such as the screws 21—21' being preferably provided.

The pawls 17—17' being ordinarily in engagement with the respective ratchet wheels 15—15', it will be obvious from the drawing that any movement of the arms 16—16' against the tension of the springs 19—19' will cause rotation of one of the ratchet wheels 15—15' held against accidental displacement by the springs 21$^a$ and 21$^b$, and a corresponding movement of the record carrying cylinder connected therewith. To effect this movement of one or the other of the respective arms 16—16', I prefer to employ electromagnets, such as are shown at 22—22'.

It will be noted that the respective pawl and ratchet mechanisms referred to are, in the embodiment shown, adapted to move the record sheet in opposite directions. To avoid tearing the sheet, it will, therefore, be understood that one of the pawl and ratchet mechanisms should be rendered inoperative before the other is actuated; and for this purpose I prefer to provide pawl lifting means, such as electromagnetic means therefor. In one embodiment of my invention I have provided a plurality of pens or pencils 24—24', which may be secured upon a carriage 25 by set screws 26, the mentioned writing points being in either case mounted to travel laterally upon the transverse rod 28 extending parallel with a traversing screw 29.

It will be understood that by the use of a plurality of writing points inclined in opposite directions, in the manner shown in Fig. 1, I am enabled to cause one writing point to contact at a suitable angle with the sheet 12 when the same is moved in one direction, and another writing point to operate satisfactorily when the sheet is moved in the opposite direction. When employing this construction, it becomes advantageous to provide means for tilting the carriage 25 in one direction when one of the ratchet mechanisms referred to is in operation, and for tilting it in the opposite direction when the other ratchet mechanism is in operation, and for this purpose I prefer to provide a pair of electromagnets 30—30', only one of these being energized at a time.

In order to maintain a suitable contact between either one of the writing points and the sheet 12, it being understood that, after a pen has made contact with the paper, it so remains through successive energizations and de-energizations of its operating magnet until the opposed magnet is energized to shift arm 31 through its mid-position. I may provide any suitable means, and I prefer to employ an arm 31; which may act as an overbalancing lever, and which may also be provided with pressure means such as the spring 32 carrying a rod 33, which is sleeved within a projection 34 upon the post 35. This upright 35 may be mounted adjacent to or made integral with the tractor 36 which imparts movement to the carriage 35; and in order to cause the movement of the writing points across the record sheet, to prevent the superimposition of one record upon another in a manner tending to confuse the reading thereof I may provide any suitable means such as the ratchet wheel 37 secured to the end of the shaft 29 and adapted to be advanced by the pawl 38 carried by the arm 39, which is normally held in contact with the stop 40 by means such as the spring 41, actuating means such as the electromagnet 42 being provided adjacent the mentioned arm 39.

From an inspection of Fig. 2 it will be understood that I prefer to employ, when I use a plurality of writing points, a record sheet of specific construction, this record sheet being preferably such that when one of the writing points is set at a transverse line marked zero, the other writing point shall be thereby set opposite another line also marked zero, each of the mentioned lines preferably extending half way across the record sheet, and it being intended that, for example, all of the upward movements in a liquid level shall be recorded on half of the sheet, and all downward movements in the same liquid level shall be recorded on the other half of the same sheet, as hereinafter described. It will be obvious that the graduations upon the sheet 12 may be either in terms of vertical distance, such as feet or inches, or in terms of quantity, such as barrels or gallons. A record so made, indicating something of sequence although nothing of absolute time, may be used, for example, to afford a check upon receipts and deliveries or losses as compared with independent records of purchases and sales.

The means by which I may move a record sheet in either of two opposite directions, and the means by which I may bring either of two points into writing position, as well as the means by which these writing points may be caused to move across a record sheet, have been indicated above; and I will now proceed to describe the arrangement of circuits by which the respective electromagnetic actuating means are suitably energized; and also the means by which the energizing of the respective electromagnetic means is made dependent upon, for example, the level of a liquid in a tank.

Referring more specifically to Figs. 6, 7 and 8, 43 is a float suspended within a tank containing a liquid and 44 may represent a flexible element such as a cord adapted to transmit motion therefrom to a pulley 45, or the like, which may be mounted upon a shaft 46 and thereby adapted to transmit a rotative or oscillatory motion to a rotatable switch actuating member 47. In the construction shown, this rotatable switch-actuating member 47 is provided with projections 48 adapted to impart a limited movement to a switch 49. This switch may be pivoted as at 50 in an intermediate or neutral position relatively to a plurality of contact points 51—51' and 52—52', so that an electric current, which may be provided by a battery 53, may pass through the wire 54 to a contact 55 upon one arm of the switch 49, which is adapted to make sequential connections with either the contacts 51 and 52 or the contacts 51' and 52'.

From an inspection of Fig. 1 it will be understood that when, for example, the rotatable switch-actuating member 47 is revolved in the direction of the arrow, the projections 48 will successively engage the upwardly extending arm of the switch 49 and by displacement thereof will cause the opposite end of the switch lever to be moved first into connection with the contact 51 and then into connection with the contact 52. As soon as one of the projections 48 shall pass beyond and release the arm 49, means such as the spring 56 may restore the switch to intermediate or neutral position, and it will be understood that a movement of the arm 49 in an opposite direction from the referred to will cause sequential connections with the contacts 51' and 52', already referred to. As the switch arm shall be moved into the position shown in Fig. 1 it will, then, first complete a circuit from the battery 53, through the conductive plate 57 of the switch 49, this plate being provided with the mentioned contact 55, and the contact 51 with which is connected the wire 58 leading to the electromagnet 23', whereby the pawl 20' will be lifted.

A further movement of the switch arm carrying the conductive plate 57 will bring the same into connection with the contact 52, with which is connected the wire 59, leading to the electromagnet 22, adapted to move the arm 16 and thereby advance the sheet 21 toward the left of Fig. 1.

Connected with the wire 59 is a branch 60 extending to the electromagnet 30, the actuation of which depresses the writing point 24 into contact with the sheet 12. In order to actuate the electromagnet 42 whenever one of the writing points 24—24' shall be brought into engagement with the sheet 12, I prefer to provide a branch 61 connected with the wire 54: and in this branch I prefer to provide a circuit closing means comprising a detent 62 secured on the arm 31 and adapted to make momentarily contact with a resilient element 63 whenever the said arm shall be moved through a vertical position, as it must do whenever one of the writing points is lifted and the other is depressed. Similarly, when the conductive plate 57 on the switch 49 shall complete sequential connections by engaging successively the contacts 51' and 52' connected respectively by the wires 64 and 65 to the electromagnets 22 and 22', the pawl 17 will be lifted and the actuating of the electromagnets 22' and 30', connected by the branch 66 of the wire 65, will cause the sheet 12 to move toward the right of Fig. 1 and the writing point 24' to contact therewith, the momentary closing of the circuit through the contact elements 62, 63 being sufficient to energize the coil 42 and thereby cause the writing points to advance transversely of the sheet 12, the movements imparted to the web and to the writing points being in either case accordant.

It will be obvious that whenever one of the projections 48 on the member 47 causes a vibration of the switch 49 into contact with one of the pairs of contacts referred to, the sheet 12 will be advanced one step, so that the length of the line drawn thereon by a writing point will be proportionate to the distance through which the float 43 may rise or fall: but the electromagnet 42 will be energized only when, incidentally to a change in the direction of movement of the sheet 12, one of the respective writing points may be lifted and the other depressed, making a momentary connection between the contacts 62 and 63.

What I claim is:

1. A recording instrument comprising a record sheet, electrical means for moving the sheet in opposite directions, two electrically controlled marking elements adapted to be positioned alternately to record on said sheet, a switch adapted to control the electric circuits of the sheet moving means and the marking elements, and a switch-actuating means, responsive to increments and decrements of a condition or quantity, provided with means for actuating the switch to successively feed the record in one direction and to reverse its direction of motion and simultaneously effect the withdrawal of one marker and the application of the other to the record sheet.

2. A recording instrument comprising a record sheet, electrical means for moving the sheet in opposite directions, two electrically controlled marking elements adapted to be positioned alternately to record on said sheet, a switch adapted to control the electric circuits of the sheet moving means and the marking elements, and a switch-actuating means, responsive to the rise and fall of the level of a liquid in a tank, provided with means for actuating the switch to successively feed the record in one direction and to reverse its direction of motion and simultaneously effect the withdrawal of one marker and the application of the other to the record sheet.

3. A recording instrument comprising a record sheet, electrical means for moving the sheet in opposite directions, two electrically controlled marking elements adapted to be positioned alternately to record on said sheet, a switch adapted to control the electric circuits of the sheet moving means and the marking elements, and a switch-actuating means, responsive to the rise and fall of the level of a liquid in a tank and including a shaft upon which the switch-actuating means is fixed, a pulley fixed upon the shaft, a flexible element running over the pulley, and a float upon one end of the flexible element, provided with means for actuating the switch to successively feed the record in one direction and to reverse its direction of motion and simultaneously effect the withdrawal of one marker and the application of the other to the record sheet.

4. A recording instrument comprising an endless record sheet, electrical means for moving the sheet in opposite directions, two electrically controlled marking elements adapted to be positioned alternately to record on said sheet, a switch adapted to control the electric circuits of the sheet moving means and the marking elements, and a switch-actuating means, responsive to increments and decrements of a condition or quantity, provided with means for actuating the switch to successively feed the record in one direction and to reverse its direction of motion and simultaneously effect the withdrawal of one marker and the application of the other to the record sheet.

5. A recording instrument comprising an endless record sheet, electrical means for moving the sheet in opposite directions, two electrically controlled marking elements adapted to be positioned alternately to record on said sheet, a switch adapted to control the electric circuits of the sheet moving means and the marking elements, and a switch-actuating means, responsive to the rise and fall of the level of a liquid in a tank, provided with means for actuating the switch to successively feed the record in one direction and to reverse its direction of motion and simultaneously effect the withdrawal of one marker and the application of the other to the record sheet.

6. A recording instrument comprising an endless record sheet, electrical means for moving the sheet in opposite directions, two electrically controlled marking elements adapted to be positioned alternately to record on said sheet, a switch adapted to control the the electric circuits of the sheet moving means and the marking elements, and a switch-actuating means, responsive to the rise and fall of the level of a liquid in a tank and including a shaft upon which the switch-actuating means is fixed, a pulley fixed upon the shaft, a flexible element running over the pulley, and a float upon one end of the flexible element, provided with means for actuating the switch to successively feed the record in one direction and to reverse its direction of motion and simultaneously effect the withdrawal of one marker and the application of the other to the record sheet.

7. A recording instrument comprising two drums spaced apart in parallel positions, a support between the drums, a record sheet adapted to be moved over the support by the operation of the drums, electrical means for moving the drums to move the sheet in opposite directions, two electrically controlled marking elements adapted to be positioned alternately to record on the sheet, a switch adapted to control the electric circuits of the drum moving means and the marking elements, and a switch-actuating means responsive to increments and decrements of a condition or quantity, provided with means for actuating the switch to operate the drums to successively feed the record in one direction and to reverse its direction of motion and simultaneously effect the withdrawal of one marker and the application of the other to the record sheet.

8. A recording instrument comprising two drums spaced apart in parallel positions, a support between the drums, a record sheet adapted to be moved over the support by the operation of the drums, electrical means for moving the drums to move the sheet in opposite directions, two electrically controlled marking elements adapted to be positioned alternately to record on the sheet, a switch adapted to control the electric circuits of the drum moving means and the marking elements, and a switch-actuating means responsive to the rise and fall of the level of a liquid in a tank, provided with means for actuating the switch to operate the drums to successively feed the record in one direction and to reverse its direction of motion and simultaneously effect the withdrawal of one marker and the application of the other to the record sheet.

9. A recording instrument comprising two drums spaced apart in parallel positions, a support between the drums, a record sheet adapted to be moved over the support by the operation of the drums, electrical means for moving the drums to move the sheet in opposite directions, two electrically controlled marking elements adapted to be positioned alternately to record on the sheet, a switch adapted to control the electric circuits of the drum moving means and the marking elements, and a switch-actuating means responsive to the rise and fall of the level of a liquid in a tank and including a shaft upon which the switch-actuating means is fixed, a pulley fixed upon the shaft, a flexible element running over the pulley, and a float upon one end of the flexible element, provided with means for actuating the switch to operate the drums to successively feed the record in one direction and to reverse its direction of motion and simultaneously effect the withdrawal of one marker and the application of the other to the record sheet.

10. A recording instrument comprising two drums spaced apart in parallel positions, a support between the drums, a record sheet adapted to be moved over the support by the operation of the drums, electro-magnetic means for independently moving one drum in one direction and the other drum in the other direction to move the record sheet back and forth, two electrically controlled marking elements adapted to be positioned alternately to record on the sheet, a switch adapted to control the electric circuits of the drum moving means and the marking elements, and a switch-actuating means responsive to increments and decrements of a condition or quantity, provided with means for actuating the switch to operate the drums to successively feed the record in one direction and to reverse its direction of motion and simultaneously effect the withdrawal of one marker and the application of the other to the record sheet.

11. A recording instrument comprising two drums spaced apart in parallel positions, a support between the drums, a record sheet adapted to be moved over the support by the operation of the drums, electro-magnetic means for independently moving one drum in one direction and the other drum in the other direction to move the record sheet back and forth, two electrically controlled marking elements adapted to be positioned alternately to record on the sheet, a switch adapted to control the electric circuits of the drum moving means and the marking elements, and a switch-actuating means responsive to the rise and fall of the level of a liquid in a tank, provided with means for actuating the switch to operate the drums to successively feed the record in one direction and to reverse its direction of motion and simultaneously effect the withdrawal of one marker and the application of the other to the record sheet.

12. A recording instrument comprising a record sheet, electrical means for moving the sheet in opposite directions, two electrically controlled marking elements adapted to be positioned alternately to record on said sheet, a switch including a pivoted lever spring pressed to neutral position, said switch being adapted to control the electric circuits of the sheet moving means and the marking elements, and a switch-actuating means including a rotatable member provided with projections adapted to engage one end of the pivoted lever, said switch-actuating means responsive to increments and decrements of a condition or quantity, provided with means for actuating the switch to successively feed the record in one direction and to reverse its direction of motion and simultaneously effect the withdrawal of one marker and the application of the other to the record sheet.

13. A recording instrument comprising a record sheet, electrical means for moving the sheet in opposite directions, two electrically controlled marking elements adapted to be positioned alternately to record on said sheet, a switch including a pivoted lever spring pressed to neutral position, said switch being adapted to control the electric circuits of the sheet moving means and the marking elements, and a switch-actuating means including a rotatable member provided with projections adapted to engage one end of the pivoted lever, said switch-actuating means responsive to the rise and fall of the level of a liquid in a tank, provided with means for actuating the switch to successively feed the record in one direction and to reverse its direction of motion and simultaneously effect the withdrawal of one marker and the application of the other to the record sheet.

14. A recording instrument comprising a record sheet, electrical means for moving the sheet in opposite directions, two electrically controlled marking elements adapted to be positioned alternately to record on said sheet, a switch including a pivoted lever spring pressed to neutral position, said switch being adapted to control the electric circuits of the sheet moving means and the marking elements, and a switch-actuating means including a rotatable member provided with projections adapted to engage one end of the pivoted lever, said switch-actuating means responsive to the rise and fall of the level of a liquid in a tank and including a shaft upon which the switch-actuating means is fixed, a pulley fixed upon the shaft, a flexible element running over the pulley, and a float upon one end of the flexible element, provided with means for actuating the switch to successively feed the record in one direction and to reverse its direction of motion and simultaneously effect the withdrawal of one marker and the application of the other to the record sheet.

15. A recording instrument comprising a record sheet, electrical means for moving the sheet in opposite directions, two electrically controlled marking elements adapted to be positioned alternately to record on said sheet, electrically controlled means for moving the marking elements laterally at each reversal of the sheet, a switch adapted to control the electric circuits of the sheet moving means and the marking elements, and a switch-actuating means responsive to increments and decrements of a condition or quantity, provided with means for actuating the switch to successively feed the record in one direction and to reverse its direction of motion and simultaneously effect the withdrawal of one marker and the application of the other to the record sheet.

16. A recording instrument comprising a record sheet, electrical means for moving the sheet in opposite directions, two electrically controlled marking elements adapted to be positioned alternately to record on said sheet, said marking elements including a carriage slidingly mounted upon a transverse rod and to which the markers are attached, a screw mounted parallel with the transverse rod, and a tractor upon the screw and engaging the carriage so that rotating the screw will move the carriage laterally, electrical means for rocking the carriage, electrical means for operating the screw, a switch adapted to control the electric circuits of the sheet moving means and the marking elements, and a switch-actuating means, responsive to increments and decrements of a condition or quantity, provided with means for actuating the switch to successively feed the record in one direction and to reverse its direction of motion and simultaneously effect the withdrawal of one marker and the application of the other to the record sheet.

In testimony whereof I have signed my name to this specification.

MARTIN MADSEN.